US008550197B2

United States Patent
Sgherri et al.

(10) Patent No.: US 8,550,197 B2
(45) Date of Patent: Oct. 8, 2013

(54) POWER-DRIVEN WHEEL FOR A MILITARY VEHICLE

(75) Inventors: Roberto Sgherri, La Spezia (IT); Giuliano Franceschi, La Spezia (IT)

(73) Assignee: Oto Melara S.p.A. con Unico Socio, La Spezia (IT)

( * ) Notice: Subject to any disclaimer, the term of this patent is extended or adjusted under 35 U.S.C. 154(b) by 1129 days.

(21) Appl. No.: 11/933,597

(22) Filed: Nov. 1, 2007

(65) Prior Publication Data

US 2010/0326748 A1 Dec. 30, 2010

(30) Foreign Application Priority Data

Dec. 15, 2006 (IT) ................. TO2006A0894

(51) Int. Cl.
*B60K 1/00* (2006.01)
*F16H 3/72* (2006.01)

(52) U.S. Cl.
USPC ............................ 180/65.51; 180/65.6; 475/5

(58) Field of Classification Search
USPC ................... 180/65.1, 65.51, 65.6, 371, 372; 475/5, 149
See application file for complete search history.

(56) References Cited

U.S. PATENT DOCUMENTS

| 4,389,586 | A | * | 6/1983 | Foster et al. | ............... 310/67 R |
| 4,402,374 | A | * | 9/1983 | Knur et al. | ................... 180/65.7 |
| 4,799,564 | A | * | 1/1989 | Iijima et al. | ................ 180/65.51 |
| 5,363,937 | A | | 11/1994 | James | |
| 5,382,854 | A | * | 1/1995 | Kawamoto et al. | ......... 310/67 R |
| 6,012,724 | A | * | 1/2000 | Pitkanen | .......................... 180/41 |
| 6,046,518 | A | * | 4/2000 | Williams | ........................ 310/43 |
| 6,276,475 | B1 | * | 8/2001 | Nakanosono | ................ 180/65.8 |
| 6,328,123 | B1 | * | 12/2001 | Niemann et al. | ........... 180/65.51 |
| 6,458,057 | B2 | | 10/2002 | Massaccesi et al. | .......... 475/302 |
| 6,922,004 | B2 | * | 7/2005 | Hashimoto et al. | ........... 310/268 |
| 7,214,155 | B2 | * | 5/2007 | Mueller et al. | ..................... 475/5 |
| 7,420,301 | B2 | * | 9/2008 | Veny et al. | .................. 310/75 C |
| 7,527,113 | B2 | * | 5/2009 | Jenkins | ...................... 180/65.51 |
| 7,556,580 | B2 | * | 7/2009 | Saito et al. | ..................... 475/154 |
| 7,622,836 | B2 | * | 11/2009 | DeVeny et al. | ............. 310/75 C |
| 8,186,467 | B2 | * | 5/2012 | Yoshino et al. | ............ 180/65.51 |
| 8,210,974 | B2 | * | 7/2012 | Moeller | ............................ 475/5 |
| 2003/0159866 | A1 | * | 8/2003 | Claypole et al. | ............. 180/65.5 |
| 2003/0189388 | A1 | * | 10/2003 | Hashimoto et al. | ........... 310/268 |
| 2005/0035676 | A1 | | 2/2005 | Rahman et al. | |
| 2005/0061565 | A1 | * | 3/2005 | Mizutani et al. | .............. 180/65.5 |

FOREIGN PATENT DOCUMENTS

| DE | 10121372 A1 | 11/2002 |
| DE | 10338659 A1 | 3/2005 |
| EP | 1560315 A | 8/2005 |
| EP | 1600324 A1 | 11/2005 |
| GB | 2405386 A | 3/2005 |

\* cited by examiner

*Primary Examiner* — J. Allen Shriver, II
*Assistant Examiner* — James M Dolak
(74) *Attorney, Agent, or Firm* — Volpe and Koenig, P.C.

(57) ABSTRACT

There is described a power-driven wheel for a military vehicle, having an axial-flow electric motor, and a hub connected functionally to the motor and rotating about an axis; the motor has an output member housed inside the hub; and the wheel has an epicyclic reducer interposed functionally between the hub and the output member.

8 Claims, 4 Drawing Sheets

POWER-DRIVEN WHEEL FOR A MILITARY VEHICLE

FIELD OF INVENTION

The present invention relates to a power-driven wheel for a military vehicle.

BACKGROUND

Power-driven wheels for civilian vehicles—as described, for example, in U.S. Patent Application Publication US-A-2005/0035676—are known which comprise a hub supporting a tire, and an axial-flow electric motor connected functionally to the hub.

More specifically, the axial-flow motor comprises an annular stator having coils, through each of which an alternating current flows; and an annular rotor connected magnetically to the stator, and having an output shaft connected mechanically, either directly or via a reducer, to the wheel hub.

The rotor has a number of permanent magnets arranged with alternate polarities facing the stator coils.

The permanent magnets generate magnetic flux directed predominantly along an axis of the rotor, and in turn generating an electromagnetic torque on the coils in known manner. The coils being angularly fixed, and therefore prevented from rotating, rotation torque is generated by reaction on the rotor, and rotation of the rotor rotates the output shaft, thus making power available to the wheel hub.

Publication US-A-2005/0035676 does not clearly specify the relative position or connection of the electric motor rotor and wheel hub.

Military vehicles require power-driven wheels capable of generating more or less the same power as axial-flow electric motors, and which at the same time are axially compact.

More specifically, the power-driven wheels must be capable of generating considerable power to overcome steep slopes and/or travel over muddy and/or marshy terrain.

Military vehicle certification tests also require that vehicles be capable of extremely steep hill starts, e.g. of 60%.

The power-driven wheels must also be axially compact, to make the best use of available space on military vehicles, and, for safety reasons, to expose as few operating component parts as possible.

Military vehicles also require fast, easy replacement of the axial-flow electric motor.

Military vehicles also require wheels equipped with cooling assemblies that can be changed without working on the wheel hub.

Finally, military vehicles also require fast tire inflation, without dismantling the hub-electric motor assembly.

SUMMARY

It is an object of the present invention to provide a power-driven wheel for military vehicles, designed to meet at least one of the above requirements of known power-driven wheels.

According to the present invention, there is provided a power-driven wheel, as claimed in the attached Claims.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
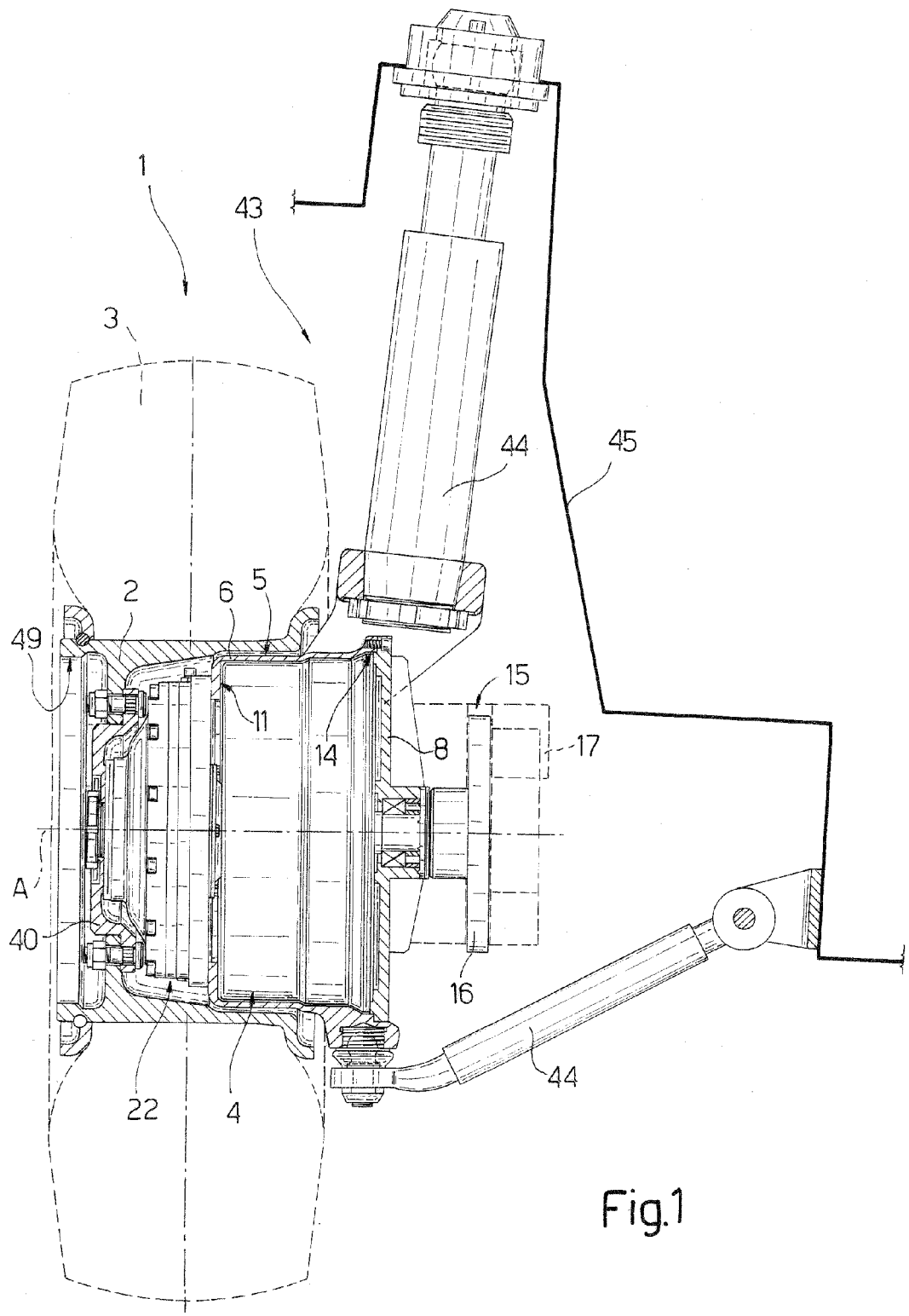
FIG. 1 shows a cross section, with parts removed for clarity, of a power-driven wheel in accordance with the present invention.

Number 1 in the accompanying drawings indicates a power-driven wheel, for a military vehicle, substantially comprising a hub 2; a tire 3 ((FIGS. 1 and 2) surrounding and angularly integral with hub 2; and an electric motor 4 (shown schematically in FIGS. 1, 2, 4) connected functionally to hub 2.

More specifically, wheel 1 has, and rotates about, an axis A; and hub 2 is tubular.

Motor 4 is housed in a casing 5, which, as described below, is axially fixed with respect to hub 2, and retains motor 4 axially in a predetermined position with respect to wheel 1.

Figure 2:
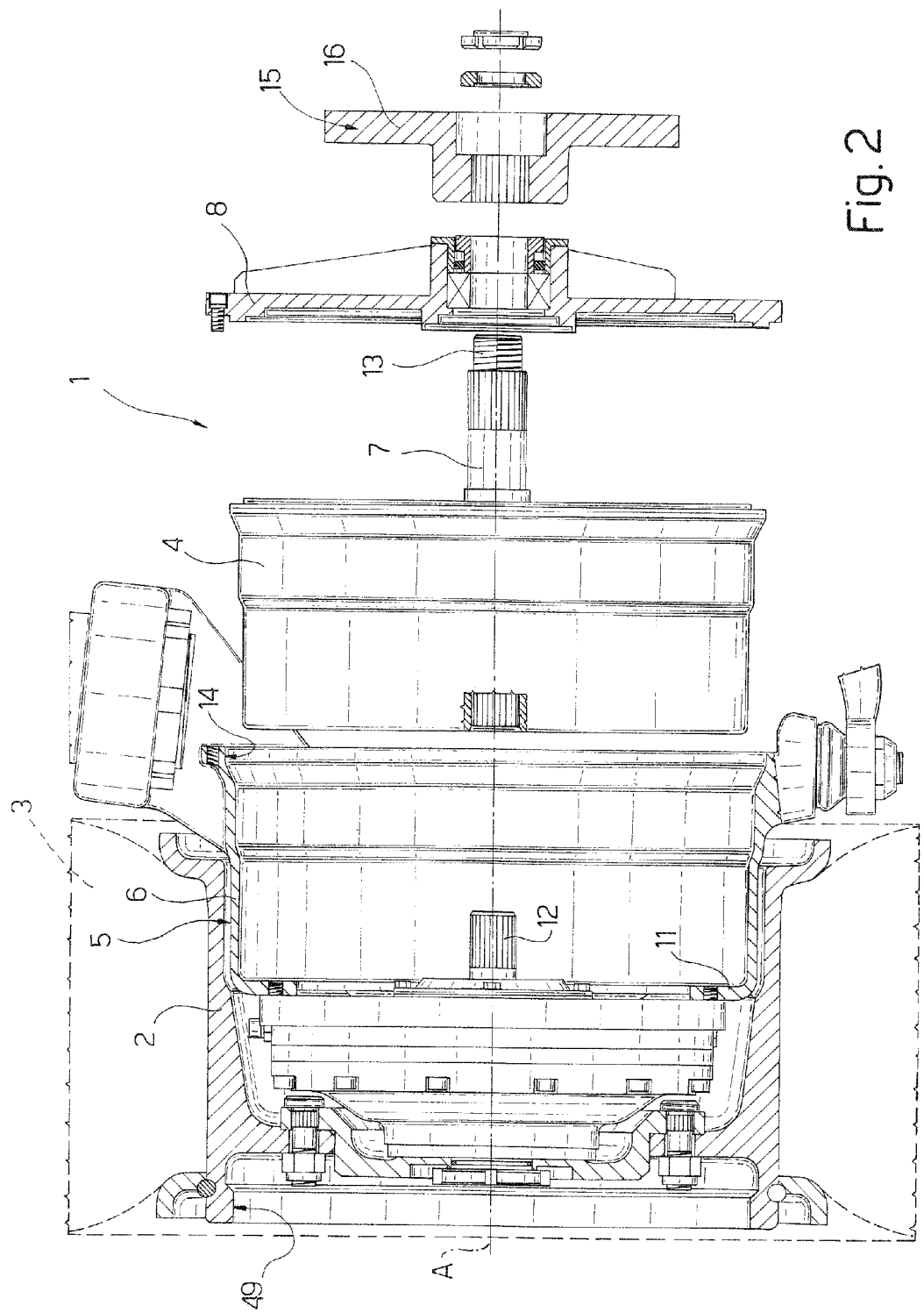
FIG. 2 shows a larger-scale, partly exploded view of the FIG. 1 wheel.
Figure 4:
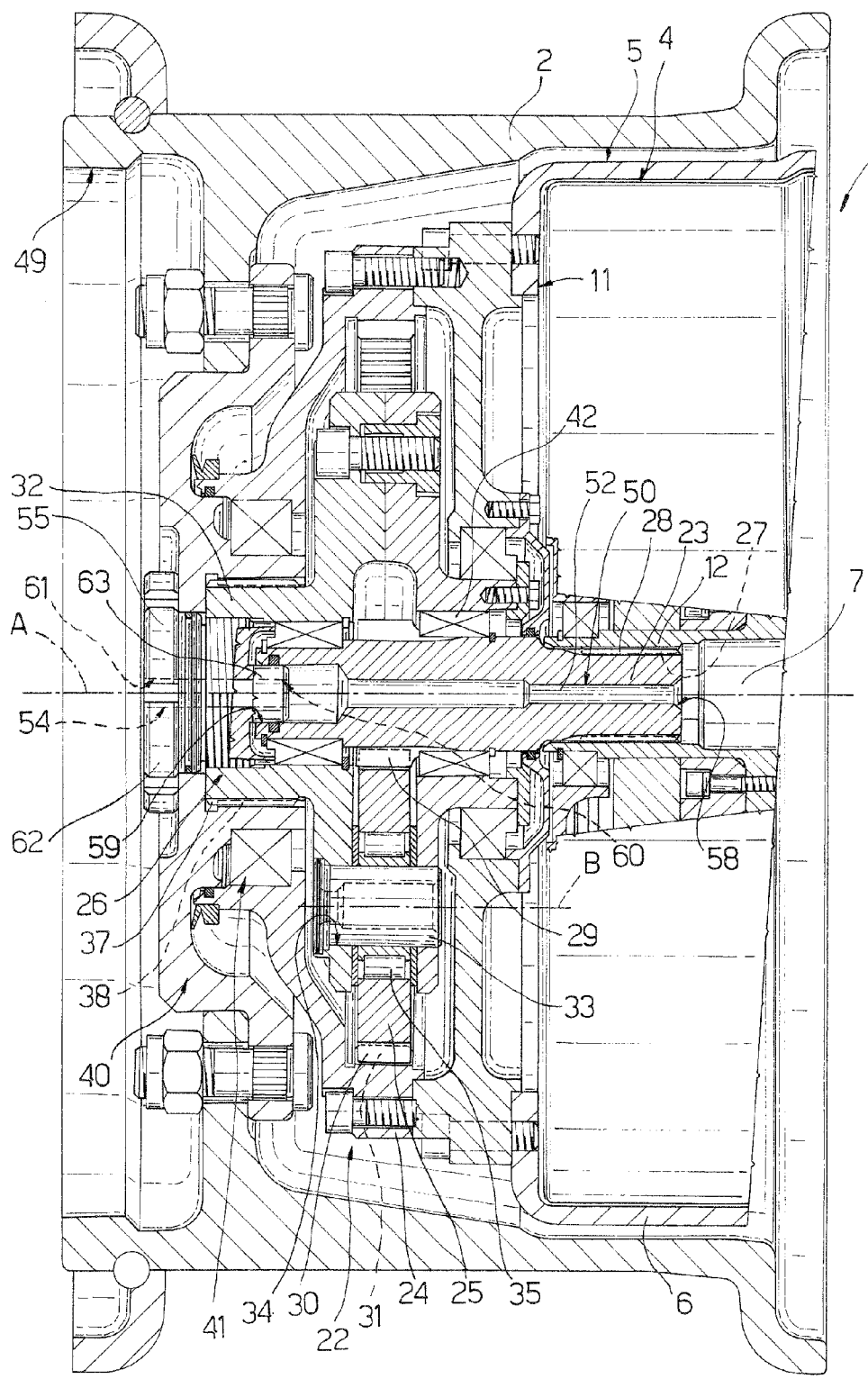
FIG. 4 shows a larger-scale view of further details of FIG. 1, with parts removed for clarity.

With reference to FIGS. 1, 2 and 4, casing 5 comprises a housing 6 for housing motor 4, and which defines, at opposite axial ends, a retaining surface 11 facing inwards of hub 2, and an opening 14 projecting outwards of hub 2. Casing 5 also comprises an end member 8 engaging opening 14 to grip motor 4 axially against retaining surface 11 and hold it in a predetermined position inside wheel 1.

Motor 4 is an axial-flow type, and has an axis coincident, in use, with axis A.

Motor 4 (FIG. 3) substantially comprises two coils 9, through which alternating electric current flows in use; a number of permanent magnets 18 generating axial flux on coils 9 and rotating with respect to coils 9; and a shaft 7 angularly integral with magnets 18 and connected functionally to hub 2.

Motor 4 also comprises a supporting body 10, which is formed in two axially spaced parts, is housed radially loosely inside housing 6, and is gripped axially between surface 11 of housing 6 and member 8.

Coils 9, magnets 18, and shaft 7 are housed inside body 10.

Coils 9 and body 10 are glued to one another.

Coils 9 are offset axially, and each wound about a respective annular core of ferromagnetic material.

Shaft 7 has an axial end 12 connected functionally to hub 2; and a second axial end 13, opposite end 12, connected functionally to a brake 15 (only shown in FIGS. 1 to 3) projecting axially from wheel 1. More specifically, brake 15 comprises, in known manner, a disk 16, and a shoe 17 (only shown in FIG. 1) which cooperates frictionally with disk 16 to brake wheel 1.

Magnets 18 are arranged to form four axially spaced magnetizing units 19. Units 19 are annular, and extend radially with respect to axis A.

Each unit 19 is defined by an annular sequence of magnets 18 arranged with alternating polarities.

Each coil 9 is interposed axially between two units 19, so that its axial ends each face a respective unit 19.

Each coil 9 is thus coupled magnetically to the units 19 between which it is interposed.

More specifically, each unit 19 is carried by a flange 20 angularly integral with a flange 21 fitted to shaft 7.

Flanges 20 are located radially outwards of flanges 21.

Shaft 7 is advantageously housed at least partly inside hub 2, and wheel 1 comprises an epicyclic reducer 22 (FIG. 4) interposed functionally between hub 2 and shaft 7.

Reducer 22 comprises a sun gear 23 connected angularly to shaft 7; a ring gear 24 fixed to surface 11 of housing 6; three planet gears (only one shown in FIG. 4) connected angularly to ring gear 24 and sun gear 23; and a planet carrier 26 connected angularly to hub 2 and planet gears 25.

More specifically, shaft 7 and sun gear 23 have respective matching, meshing splines 27, 28, and are therefore connected in angularly fixed, axially free manner.

Planet gears 25 are equally spaced angularly, and each extend along a respective axis B parallel to and offset with respect to axis A.

Each planet gear 25 has teeth 30 which, at opposite radial ends, mesh with teeth 29 on sun gear 23, and with teeth 31 on ring gear 24.

More specifically, teeth 30, 29 mesh in a position radially inwards with respect to the meshing position of teeth 30, 31.

Planet carrier 26 comprises a main body 32, of axis A; and three pins 33 carried by main body 32 and extending along respective axes B.

More specifically, main body 32 surrounds sun gear 23, and comprises teeth 37 meshing with teeth 38 of a flange 40 integral with hub 2.

Main body 32 is axially hollow, and houses, radially loosely, the end of sun gear 23 opposite spline 27.

More specifically, main body 32 is defined by two axially opposite annular flanges extending perpendicular to axis A.

Each pin 33 is housed inside a hole 34 defined by a respective planet gear 25. More specifically, each pin 33 is supported inside respective hole 34 by a bearing 35, so as to hinge planet carrier 26 to planet gears 25 about respective axes B.

Flange 40 is supported inside ring gear 24 by a bearing 41.

Reducer 22 comprises two axially spaced bearings 42, each interposed radially between sun gear 23 and a respective flange of main body 32 of planet carrier 26.

Figure 3:
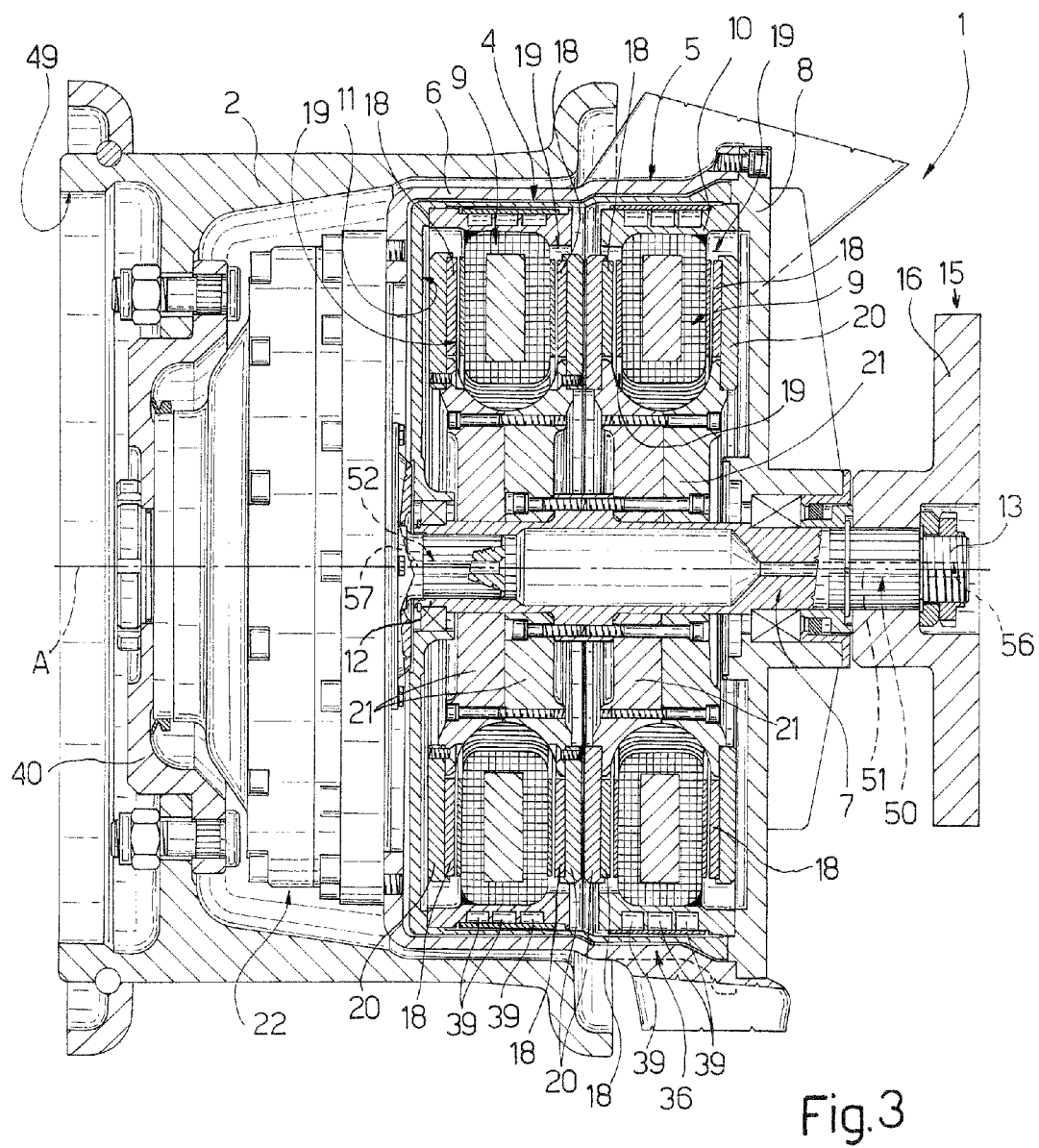
FIG. 3 shows a larger-scale view of details of FIG. 1, with parts removed for clarity.

As shown in FIGS. 1, 2 and 3, member 8 and brake 15 are axially hollow to permit insertion of a portion of shaft 7 adjacent to end 13.

More specifically, end 13 is housed in a through seat formed coaxially in brake 15, and is fixed to brake 15 to make shaft 7 and brake 15 angularly integral.

Member 8 is fitted releasably to housing 6 by screws.

More specifically, member 8 is fitted to housing 6 by a radial end opposite axis A.

As shown in FIG. 1, a suspension 43 connects wheel 1 to a frame 45 (shown schematically by a broken line in FIG. 1) of the military vehicle.

Suspension 43 comprises two arms 44, both connected to housing 6 of casing 5 on opposite sides of axis A.

Arms 44 and frame 45 are arranged with respect to housing 6 so that, when member 8 is removed from housing 6, motor 4 can be inserted through opening 14 without interfering with suspension 43.

Body 10 defines a cooling circuit 36 (FIG. 3) located radially outwards of coils 9 and defined by a number of helical cavities 39, along which coolant flows through body 10 to cool motor 4.

Wheel 1 also comprises a fluidic connector 50 (FIGS. 3, 4), which connect an inner chamber 49 of tire 3 fluidically to the outside to permit air circulation by which to inflate tire 3.

Chamber 49 is connected fluidically to the inner tube of tire 3 in a manner not shown.

More specifically, a fluidic connector 50 comprise a conduit 51 (FIG. 3) extending coaxially through shaft 7; and a conduit 52 (FIG. 4) extending through sun gear 23 and connected in fluidtight manner to conduit 51.

A fluidic connector 50 also comprise a conduit 54 (FIG. 4), which is connected in fluidtight manner to conduit 52, opens inside chamber 49, and is formed in a pin 55 angularly integral with planet carrier 26.

More specifically, pin 55 extends axially between chamber 49 and sun gear 23, and comprises a portion 62 engaging an axial hole in flange 40; and a portion 63 axially opposite portion 62 and engaging an end portion of conduit 52 facing chamber 49. Portion 62 is radially larger than portion 63.

More specifically conduit 51 has opposite axial ends 56, 57 connected fluidically to the outside and to an end 58 of conduit 52 respectively.

Conduit 51 also comprises opposite axial end portions; and an intermediate portion larger radially than the axial end portions.

Conduit 52 has an axial end 59 opposite end 58 and housing portion 63 of pin 55.

Conduit 52 increases in size radially from end 58 to end 59.

Conduit 54 has an axial end 60 defined by portion 63 and housed inside conduit 52; and an end 61 defined by portion 62 and facing inwards of chamber 49.

In actual use, motor 4 is housed inside casing 5 and gripped axially between surface 11 of housing 6 and member 8.

Alternating electric current flows through coils 9, which are swept by the magnetic flux, parallel to axis A, generated by magnets 18 of units 19.

The magnetic flux generated by units 19 generates a torque, of axis A, on coils 9 in known manner.

Coils 9 in turn exert on units 19 a torque of equal intensity and also directed along axis A.

Coils 9 being angularly fixed with respect to axis A, units 19, by reaction, rotate about axis A, thus integrally rotating shaft 7.

Shaft 7 integrally rotates sun gear 23 of reducer 22, by virtue of the coupling defined by splines 27, 28.

Rotation of sun gear 23 rotates planet gears 25 in known manner about respective axes B, and revolves planet gears 25 about axis A, while ring gear 24 remains fixed.

Rotation of planet gears 25 in turn rotates planet carrier 26 and hub 2 about axis A.

In the event of a flat tire 3, air can be fed into chamber 49 by a fluidic connector 50 to inflate the inner tube of tire 3.

More specifically, this is done by connecting a compressed-air source to end 56 of conduit 51, so that air flows successively along conduits 51, 52 and 54 into chamber 49 and the inner tube of tire 3.

Motor 4 is removed from wheel 1 by simply removing member 8 from housing 6 and withdrawing motor 4 through opening 14 of housing 6.

The advantages of wheel 1 according to the present invention will be clear from the foregoing description.

More specifically, wheel 1 generates considerable power by employing an axial-flow motor 4, and is axially compact, by virtue of shaft 7 being housed at least partly inside hub 2, and hub 2 and shaft 7 being connected by reducer 22.

Being epicyclic, reducer 22, in fact, provides for considerable speed reduction and torque increase, while also being axially compact.

The considerable torque increase achieved using reducer 22 allows wheel 1 to overcome steep slopes and/or to travel easily over muddy and/or marshy terrain.

Moreover, wheel 1 is safeguarded against damage, in the event of attack of the military vehicle, by virtue of most of shaft 7 being housed inside hub 2.

Body 10 not being used to connect wheel 1 structurally to frame 45, cooling circuit 36 can be replaced without interfering with either suspension 43 or frame 45.

Motor 4 can be removed from and inserted into housing 6 extremely easily, by virtue of arms 44 of suspension 43 being connected solely to housing 6.

Member 8 can therefore be removed from housing 6 without interfering with suspension 43, thus enabling troublefree removal of motor 4 through opening 14.

Finally, a fluidic connector 50 provide for troublefree inflation of tire 3.

Tire 3, in fact, can be inflated by connecting the compressed-air source to end 56 of conduit 51, without interfering with either hub 2 or motor 4.

Clearly, changes may be made to power-driven wheel 1 as described and illustrated herein without, however, departing from the protective scope as defined in the accompanying Claims.

In particular, coils 9 may be integral with shaft 7, and magnets 18 integral with body 10.

What is claimed is:

1. A military vehicle power-driven wheel, comprising:
   an axial-flow electric motor; and
   a tubular hub having, at one end, an integral flange, arranged in driven connection with said motor and rotating about an axis; said motor comprises an output member housed inside said hub; and
   an epicyclic reducer, housed inside said hub, interposed functionally between said hub and said output member; wherein said motor is housed partially inside said hub and closes a free open end of said hub opposite said flange; and
   wherein said motor is housed in a casing axially fixed with respect to said hub and connected to a frame of the military vehicle by a suspension.

2. A wheel as claimed in claim 1, wherein said epicyclic reducer comprises a sun gear connected angularly to said output member of said motor; a ring gear fixed to a casing of said motor; at least two planet gears connected in rotary manner to said ring gear and said sun gear; and a planet carrier connected in rotary manner to said planet gears and connected angularly to said hub.

3. A wheel as claimed in claim 2, wherein said sun gear and said output member are connected releasably to each other.

4. A wheel as claimed in claim 2, wherein said sun gear and said output member of said motor are angularly integral.

5. A wheel as claimed in claim 4, wherein said sun gear and said output member of said motor have respective meshing splines.

6. A wheel as claimed in claim 1, wherein said planet carrier has first teeth meshing with second teeth angularly integral with said hub.

7. A wheel as claimed in claim 1, wherein said output member is connected functionally to a brake member.

8. A military vehicle comprising a power-driven wheel as in claim 1.

* * * * *